Sept. 24, 1957

G. X. LENS 2,807,376

COMBINED CODE RECORDER AND SELECTOR

Filed Aug. 12, 1955

Inventor
G. X. LENS
By Robert Harding Jr.
Attorney

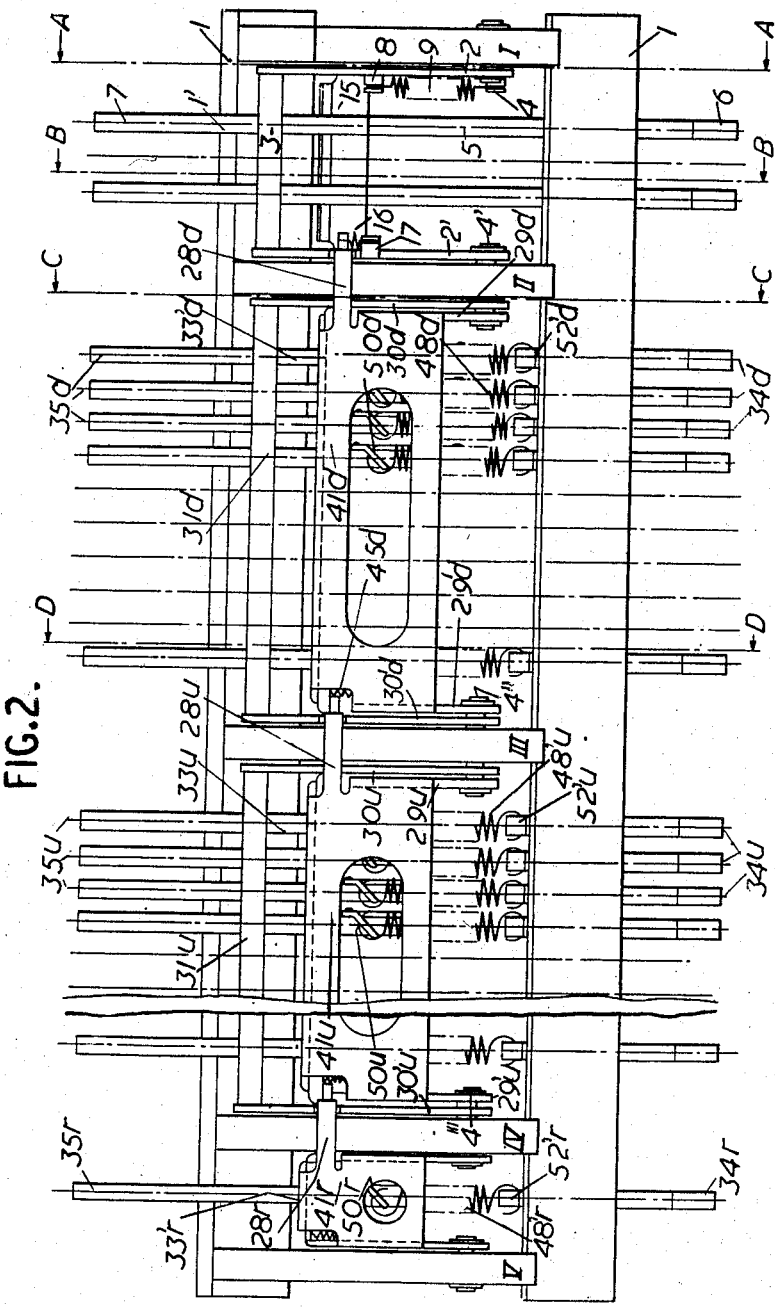

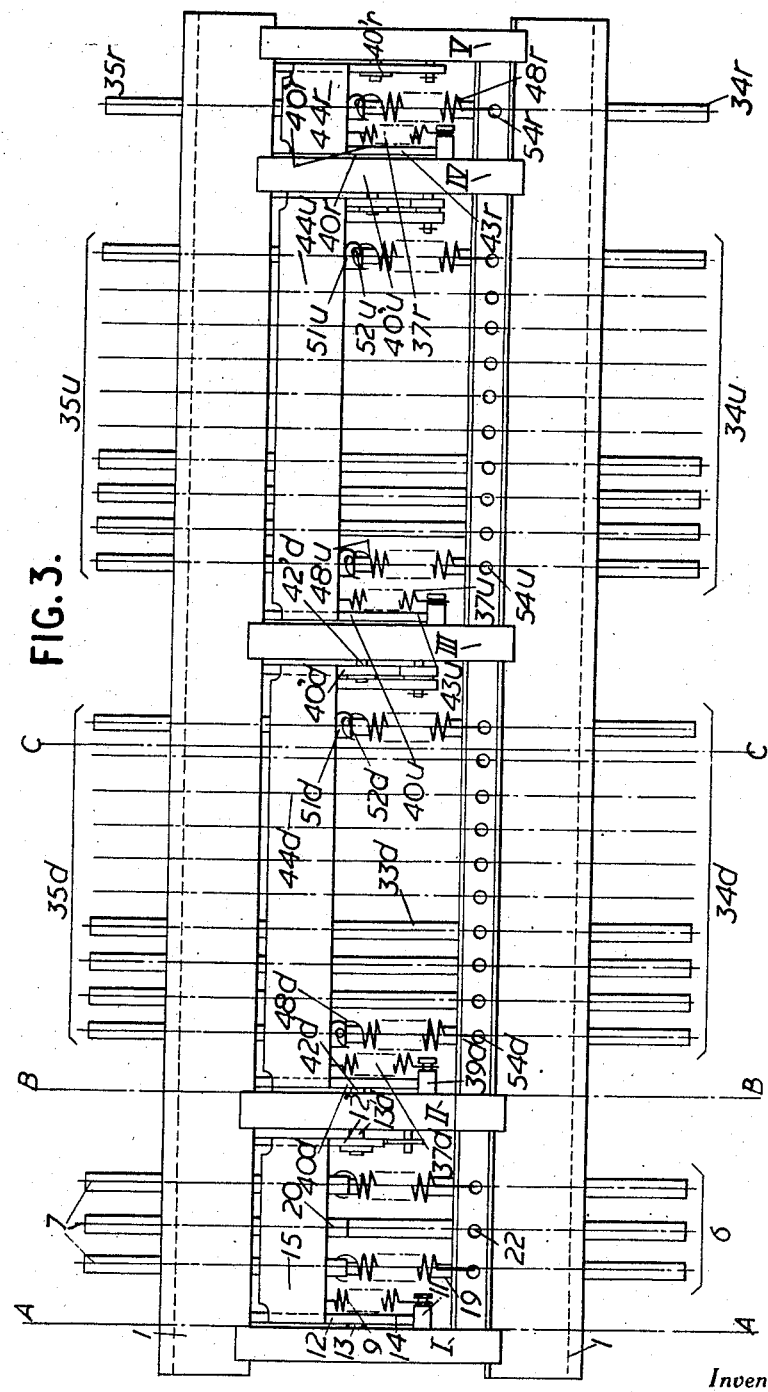

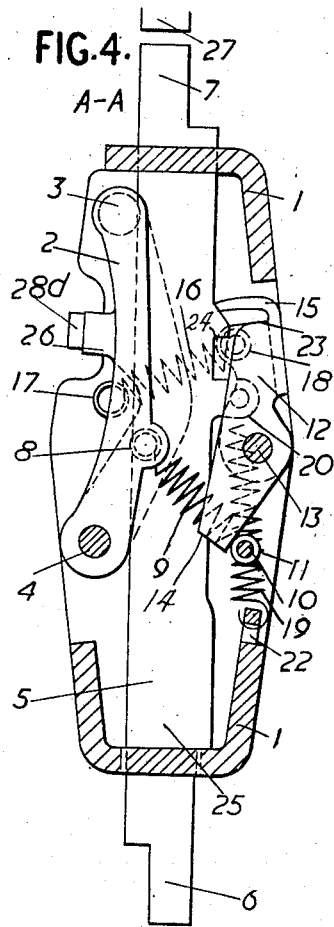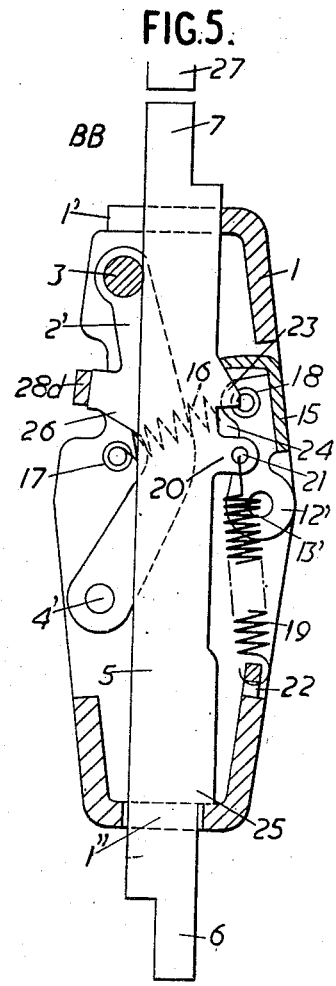

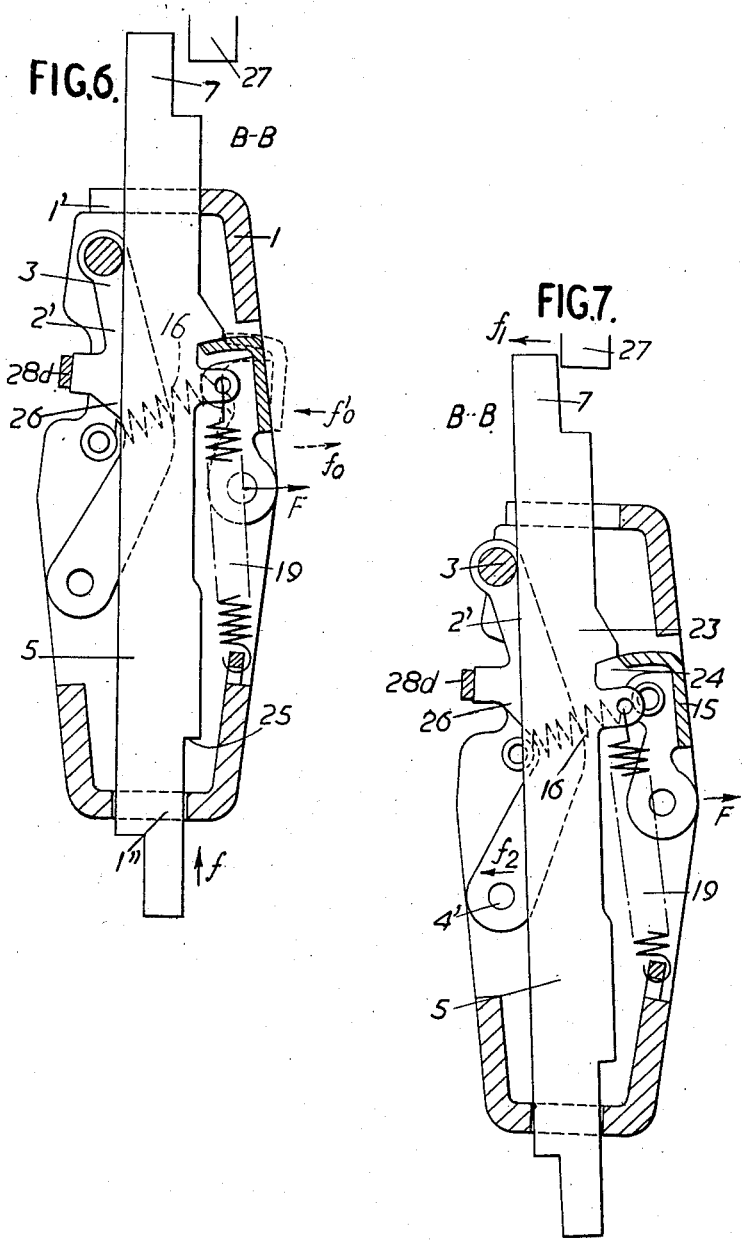

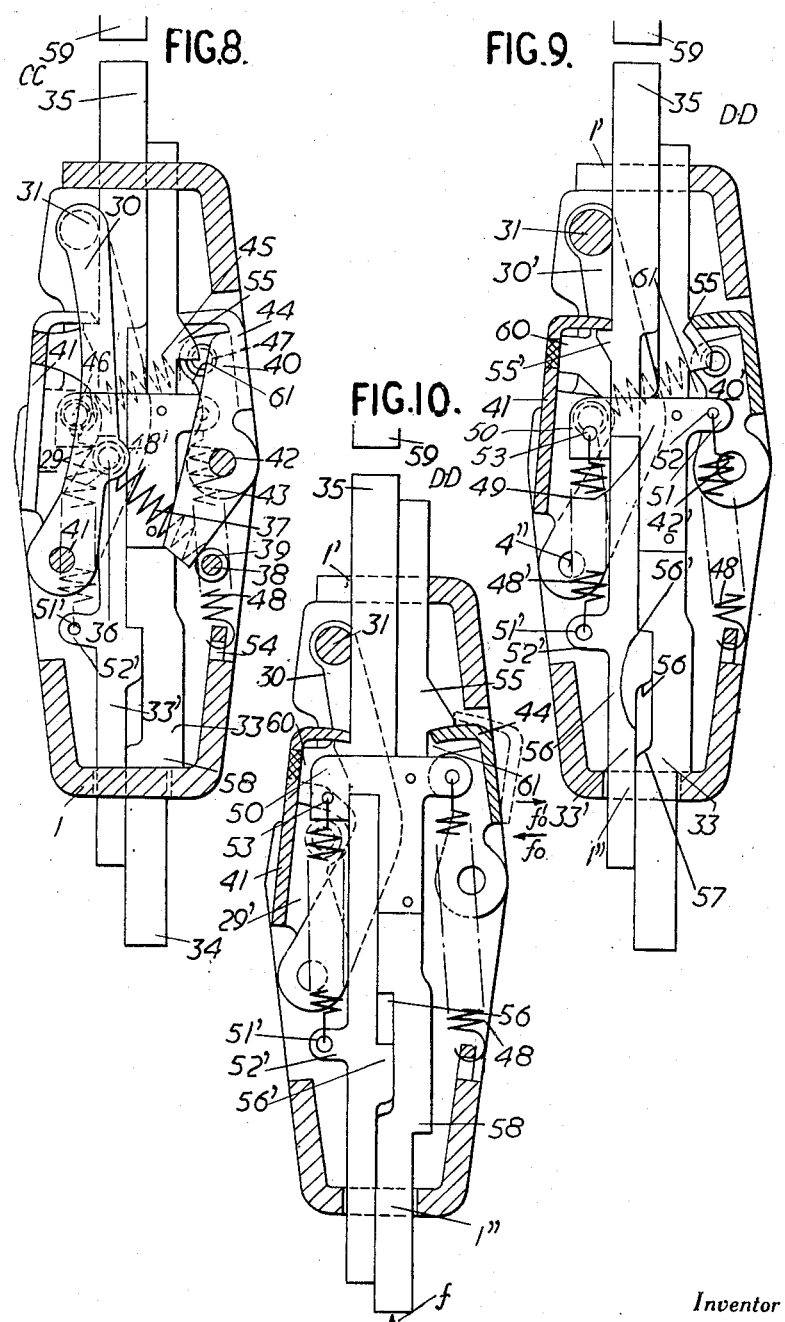

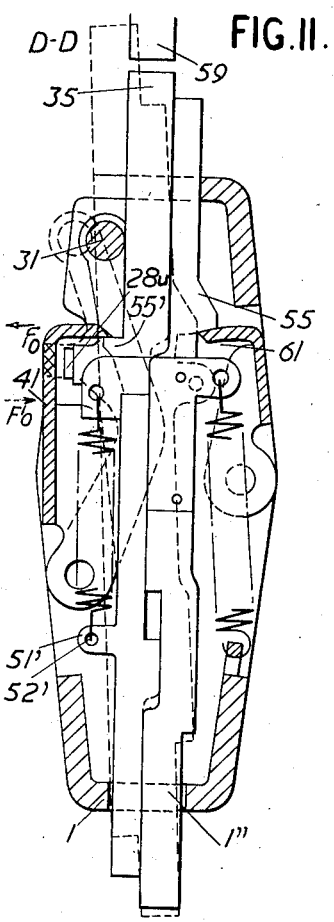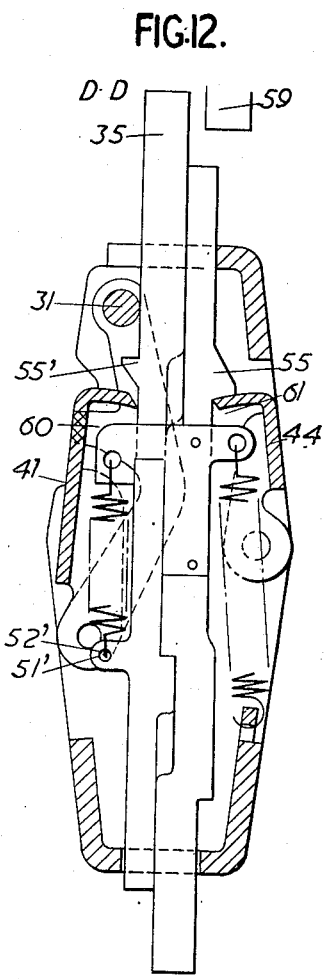

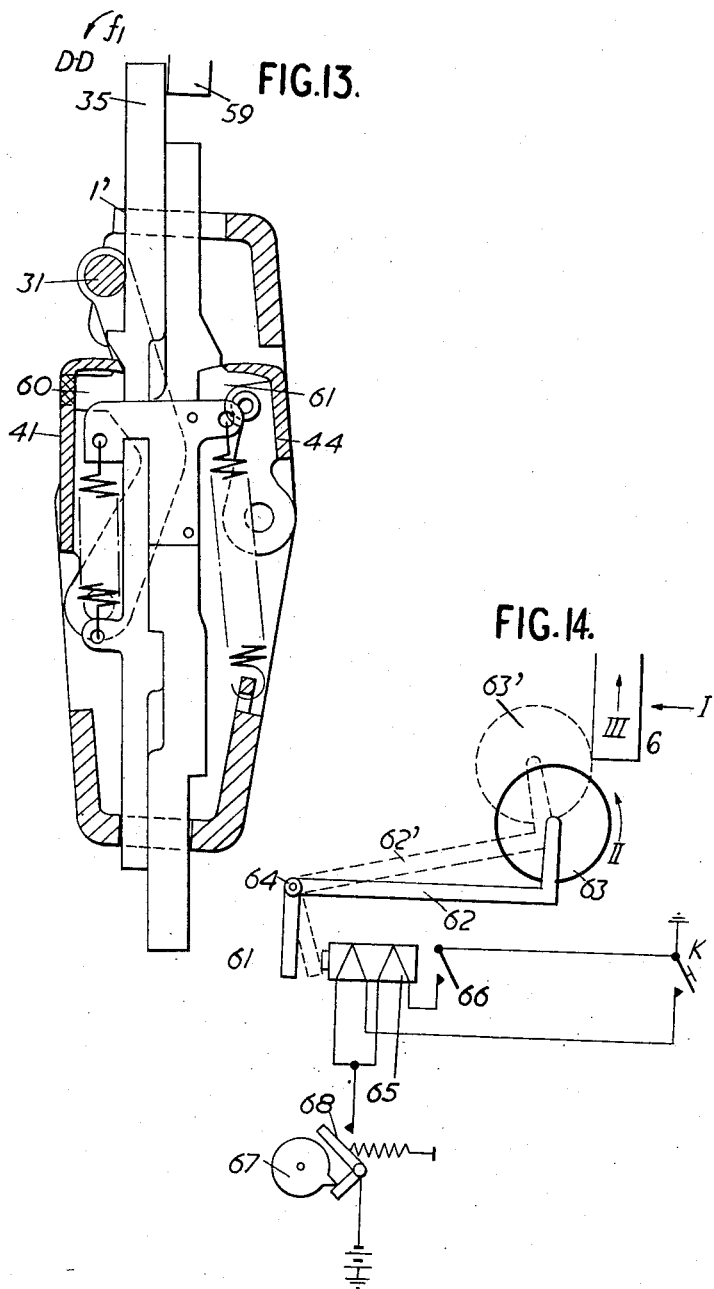

Sept. 24, 1957

G. X. LENS 2,807,376

COMBINED CODE RECORDER AND SELECTOR

Filed Aug. 12, 1955

INVENTOR.
GEORGES X. LENS
BY
*Robert Harding Jr.*
ATTORNEY

United States Patent Office 2,807,376
Patented Sept. 24, 1957

2,807,376
COMBINED CODE RECORDER AND SELECTOR

Georges Xavier Lens, Antwerp, Belgium, assignor to International Standard Electric Corporation, New York, N. Y., a corporation of Delaware Application August 12, 1955, Serial No. 528,012

Claims priority, application Netherlands October 16, 1954

8 Claims. (Cl. 214—11)

The invention relates to a combined code recorder and selector for use in sorting machines and in particular for use in a letter sorting machine.

In a known sorting machine, the letter holder conveying the letter carries, transversely to the movement, a plurality of fingers of which a number is operated in a combination which corresponds with the destination of the wanted receptacle, whilst at each destination is provided, also transversely, an equal number of fixed stops arranged in a combination characterizing the destination, so that only when a letter holder reaches the required destination all the fingers of the finger combination meet all the stops of the corresponding stop combination, which causes the transfer of the letter from the letter holder to the receptacle.

Since several stops may have the same transversal position for several combinations, each operated finger of a mobile letter holder may meet quite a number of stops before reaching the required destination, which causes unnecessary wear and produces much noise and vibrations at the speed of the conveying mechanism.

In another kind of sorting machine used hitherto, for instance the letter sorting machine disclosed in the copending application of M. Neyt, filed June 1, 1951, and bearing Serial No. 229,393, the letter holders do not carry code fingers and no code stops are provided at each of the destinations, but a separate electrical equipment is provided for registering the destination code and for controlling accordingly the opening of the letter holder when the letter has completed the required travel length corresponding to the required destination, which travel length is evaluated by the mentioned electrical equipment.

In such machines, the electrical equipment for calculating the number of steps that a letter holder must travel before reaching the destination corresponding to the code and thereafter for counting the steps effectively travelled by the letter holder, is engaged for the whole duration of the travel, which duration may be long for a far distant destination on the machine. A plurality of such equipments must therefore be provided to be able to sort all the letters with a regular and continuous rhythm without waiting for a controlling equipment to become free.

Such machines become thus expensive, they consume a rather heavy amount of current and require a specialized staff for maintenance.

An object of the invention is to provide mechanical means for controlling the letter holders' travel which are simple, economic and for which the wear, noise and vibrations are highly reduced.

A further object of the invention is to provide easy means for checking at any time the progression of any letter holder and for detecting easily any disturbance or defect in the course of said progression.

According to the main feature of the invention, there is provided a sorting machine comprising a conveyor moving along a plurality of destinations, a plurality of code recorders each comprising a plurality of groups of recording elements for recording any code combination corresponding to any of said destinations to which an object to be sorted may have to be directed, each of said recording elements having a first stable normal condition and a second stable recording condition, such code combination consisting of one corresponding element being in said second recording condition in each of said groups of said plurality of groups, and comprising further fixed means for detecting a recorded combination of elements in said second condition at the time that the corresponding object has reached its destination and thereupon to deliver said object to said destination, with the characteristic that the elements in all groups of said plurality of groups starting with the second group have also a third stable recording condition, said detecting means being however unable to detect said third condition, that upon any of said recorders receiving signals characterizing a particular destination one corresponding element of said first group of said plurality of groups is transferred from the first to the second condition, whilst one corresponding element in each other group of said plurality of groups is transferred from the first to the third condition, that transfer means are provided between successive groups of said plurality of groups for transferring, upon an element in the second condition being detected in a group and subsequently brought back to the first condition, the element of the immediately following group from the third condition in which it had been previously set, to the second condition in which it can now be detected in turn, whereby during the conveying travel of the object the detection of its destination is carried out in stages, only one element at a time being in the second condition and therefore being able to be detected at a corresponding part of said travel depending on the destination code.

According to another feature of the invention, in each recorder each of said groups of elements comprises a first memory holding means provided in common for all elements of said group for preventing, upon any element being transferred from the first stable normal condition to said second stable condition (first group of elements) or upon any element being transferred from said first stable normal condition to said third stable condition (other groups of elements), said element from being transferred back to said first stable normal condition before being detected in said second condition by said fixed detecting means, each of said other groups of elements further comprises a second memory holding means provided in common for all elements of said group for preventing any element therein from being transferred from said third stable condition to said second stable recording condition before an element of the preceding group has been detected by said fixed detecting means as being in said second stable condition.

According to another feature of the invention, an element in a recorder consists of a pair of flat bars displaceable in a plane parallel to the direction of the carrying conveyor, said pair comprising a cocking bar for setting the element in said third stable condition and a selecting bar for setting said element in said second stable condition, one pair of ends of said bars being inserted with a certain clearance within a slot at the bottom of the frame holding said recorder and the other pair of ends in an aperture at the top of said frame, in such a way that both bars can rotate in their plane within said slot and aperture and can be moved longitudinally through said slot and aperture, said cocking and selecting bars being interconnected by means of a first spring so that the longitudinal motion of said cocking bar stores energy in said spring, the selecting bar being at that moment held by said second memory holding means, said cocking and selecting bars comprising stopping means to limit their relative travel, a shoulder part of said cocking bar being normally forced by means of a second spring against the rim of said slot, no longitudinal stress being then exerted on said selecting bar, both cocking and selecting bars being held laterally by said transfer means and by said first and second memory holding means and are thus prevented from rotating in their plane when they are in said first normal condition.

According to another feature of the invention, said transfer means each common to all elements of a same group consist of a common release crank comprising a transversal crank pin and two lateral webs, said webs being able to rotate around a suitable transversal axis, a spring fixed to said crank being provided to apply said crank pin against the lateral side of said selecting bars, so that said crank is caused to rotate against the action of said spring when a selecting bar of the group is stripped by a detecting means, said crank carrying an extension member for temporarily driving, upon being rotated, the adjacent second memory holding means controlling the selecting bars in the following group so as to permit the element in that group which is in said third condition to be placed into said second condition.

According to another feature of the invention, said first memory holding means consist, in each element group of a recorder, of a common catching pawl able to rotate around a suitable transversal axis by the intermediary of its two lateral webs, said catching pawl being normally forced by spring action against the lateral side of all the selecting bars of the group (first group) or against the lateral side of all the cocking bars of the group (other groups) and being provided to hold any of these bars by means of a protruding part provided thereon, when said bar has been moved longitudinally into said second or third stable condition.

According to another feature of the invention, said second memory holding means consist, in each other element group of a recorder, of a common release pawl able to rotate around a suitable transversal axis by the intermediary of its two lateral webs, said release pawl being normally forced by spring action against the lateral side of all the selecting bars of the group and holding normally any of these selecting bars by means of a protruding part provided thereon thus preventing said selecting bar from being moved longitudinally into the second stable condition, said release pawl carrying an extension on which said extension member of said common release crank of the preceding group normally rests, whereby upon said crank rotating as a result of the preceding selection stage being completed, said common release pawl is driven by said extension member and rotates so as to be disengaged from the protruding parts of the selecting bars thereby permitting that bar in the third stable condition to be longitudinally moved into said second stable condition.

According to yet another feature of the invention, said sorting machine in which said conveyor carries a plurality of object holders spaced at regular intervals, is characterized by an auxiliary conveyor being provided at a reduced scale of said conveyor, said conveyor and said auxiliary conveyor taking the same cyclic duration between two successive passages at a given point of their travel, whereby the linear conveying speed of said auxiliary conveyor is also at said reduced scale with respect to the linear speed of said conveyor, and that said code recorders are mounted on said auxiliary conveyor at regular intervals which are also at said reduced scale of the intervals between said object holders on said conveyor, whereby the complete assembly comprising said auxiliary conveyor and said code recorders forms an image at said reduced scale of the assembly comprising said conveyor and said holders.

The above mentioned and other objects and features of the invention will become more apparent and the invention itself will be best understood by referring to the following description of an embodiment taken in conjunction with the accompanying drawings in which:

Fig. 1 shows a perspective view with cut away portions of a combined code recorder and selector according to the invention, as seen along the direction of motion of the conveyor;

Fig. 2 shows a front elevation of said combined code recorder and selector in a plane transverse to the direction of motion and seen by the same observer.

Fig. 3 shows a rear elevation of the structure shown in Fig. 1;

Fig. 4 shows a sectional view of Fig. 2 along A—A;

Fig. 5 shows a sectional view of Fig. 2 along B—B;

Fig. 6 shows the same sectional view as shown in Fig. 5 with the last element in the selecting condition;

Fig. 7 shows the same sectional view as shown in Fig. 5 with the last element in the selecting condition meeting a detecting device and being restored to normal;

Fig. 8 shows a sectional view of Fig. 2 along C—C;

Fig. 9 shows a sectional view of Fig. 2 along D—D;

Fig. 10 shows the same sectional view as shown in Fig. 9 with the last element in the recording condition;

Fig. 11 shows the same sectional view as shown in Fig. 9 with the last element being brought in the selecting condition;

Fig. 12 shows the same sectional view as shown in Fig. 9 with the last element in the selecting condition;

Fig. 13 shows the same sectional view as shown in Fig. 9 with the last element in the selecting condition meeting a detecting device and being restored to normal;

Fig. 14 shows, as an example, a possible electromagnet device and circuit for cocking a recorder element.

Figure 15:
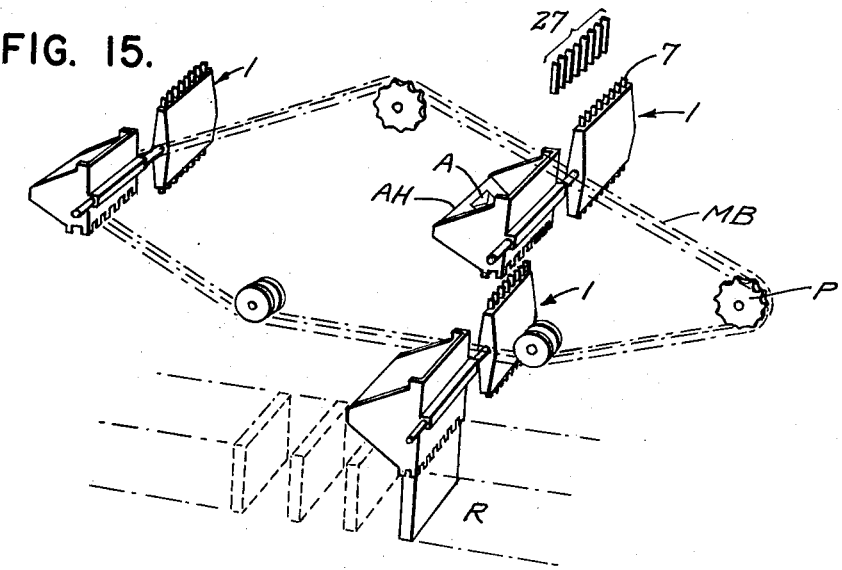

In the above cited Dutch patent each available letter-holder on a conveyor chain carries $m$ members of which only $n$ ($n<m$) are operated thus enabling $$C_m^n$$

possible combinations corresponding each to a different destination receptacle. When the sorting operator depresses the control keys according to the required destination, all the $n$ members of the corresponding combination are physically and together set into operative position. At each destination is also provided a particular combination of $n$ members in a fixed detecting position. Thus a letter is delivered to a destination receptacle when a combination of $n$ members in operative position on the mobile letter holder meets the identical combination of $n$ members in the fixed detecting position corresponding to the destination receptacle.

If, on the other hand, the $m$ members are now divided into $n$ ($m>n>1$) groups and if combinations characterizing the various destinations are obtained by energizing only one member in each group and if, further, the elements to be energized are operated one after the other, the operation of an element in a group resulting from the previous operation of an element in the preceding group and from the detection of the latter by a suitably located detecting member, a selection in stages occurs, with the result that ineffective detections of operated members will be entirely avoided.

As compared with the previous system, the wear as well as the noise will be considerably reduced.

Taking now the example of a letter sorting machine, as for instance disclosed in U. S. Patents Nos. 2,689,657, 2,761,680 and 2,764,275, in which the objects to be sorted travel along a common route determined by the conveying chain to which are fixed all the object holders but are delivered in different points of this route which correspond to the different destination receptacles, we can assume that there are three hundred such destination receptacles and that the conveying chain meets successively these receptacles in their number order from 100 to 399. We can suppose that these receptacles are divided in three groups of a hundred receptacles respectively numbered from 100 to 199, from 200 to 299, from 300 to 399, and that each of these receptacle groups is subdivided in ten consecutive subgroups of ten receptacles. For characterizing for instance receptacle No. 312, it is therefore required: indication 3 to choose the required group of hundreds (300-399), indication 1 to choose in this hundreds group the required tens subgroup (310-319), indication 2 to choose in this tens subgroup the required receptacle (No. 312).

Since the letter holder takes a certain time before reaching its destination receptacle and since it takes also a certain time previously to meet successively the preceding other receptacles in the order of their increasing number, it is not necessary to give the three indications (3, 1, 2) together from the start, the selection can be performed by successive stages in time. Indeed, it is sufficient to give first the indication 3 which indicates that in the course of the letter holder's travel the receptacles numbered from 100 to 299 can be passed without delivering the object. Having passed the receptacle 299 it is then sufficient to give the indication 1 which indicates that the receptacles numbered from 300 to 309 can also be passed without delivering the object. Finally, having passed the receptacle 309, by giving the indication 2 which indicates that the receptacles 310 and 311 can also be passed without delivering, the object will be delivered in receptacle 312 since no further indication is given.

It may be found convenient for practical reasons to have the numeric indications of the code destination impressed at corresponding selection stages on mechanical or other suitable means associated with the travelling object holder itself or with an image object holder travelling on an image conveyor. In this manner the impressed mechanical means, at corresponding selection stages, by encountering fixed stops or other suitable detecting means, control stage by stage the travel of the object holder or of the image object holder.

Since an object passes once in front of the sorting operator at the originating point, the operator must form at that moment the complete destination code and therefore communicate together at the start the three numeric indications to the mechanical means or other suitable means associated with the object holder in which the object is introduced. It thus appears necessary that the mechanical means or other suitable means should comprise recording means for the storage of all the code numeric indications from the start and selecting means which only become operative for each numeric indication of the code in succession at corresponding selection stages spread in time.

For that purpose the above mentioned mechanical means or other suitable means associated with an object holder or its image may comprise a plurality of selection elements divided in groups, one group per selection stage, each group comprising as many selection elements as there are selection possibilities at that stage.

For instance in the example given, a first group would comprise three selection elements for the hundreds digits 1, 2, 3, respectively, a second group would comprise ten selection elements for the tens digit 0, 1, 2, ... 9, respectively and a third group would also comprise ten selection elements for the units digit 0, 1, 2, ... 9, respectively.

The selection elements may be in either one of three conditions: normal, recording and selecting conditions, except the elements of the first group corresponding to the first selection stage which is only required to be either in the normal or in the selecting condition, since at that stage no code storage is necessary.

The selecting condition is the only one which is effectively operative for the control of the letter holder's travel towards its destination, i. e. capable of being detected by the fixed detecting means.

When the operator forms the complete destination code, for instance by depressing the keys of his keysender, this causes simultaneously one element of the first group to be brought directly to the selecting condition (operative) and one element in each of the following groups to be brought to the recording condition (non operative).

For instance, in case the code destination is 312 with a three digit code only, of the only three groups of elements, element 3 of group 1 is brought from the normal to the selecting condition, element 2 of group 2 (element 1 is for code digit 0) is brought from the normal to the recording condition and element 3 of group 3 (element 1 is for code digit 0) is brought from the normal to the recording condition.

When the object holder has passed the destination receptacles numbered from 100 to 299, a detecting device associated with the third hundreds group of receptacles detects the third element of the first group of elements which is in the selecting condition. As a result, this third element is brought back to the normal condition causing the element 2 of the second group immediately following and that element only to be brought from the recording to the selecting condition, because in the groups other than the first the arrangement is such that only the elements previously brought in the recording condition are capable of being brought later to the selecting condition, no direct passage from the normal to the selecting condition being possible for these elements. Thus element 2 of group 2 is now in the operative condition capable of being detected by the fixed detecting means. When the object holder has passed the receptacle 309, a detecting device detects this element 2 which is in the selecting condition. As a result, this element is brought back to the normal condition causing the element 3 of the third group immediately following and that element only to be brought from the recording to the selecting (operative) condition where it is capable of being detected in turn when the object holder reaches the receptacle 312 where the object is to be delivered.

It can be seen that instead of a code $$C_m^n$$

a code $$C_3^1 \; C_{10}^1 \; C_{10}^1$$

is now used, i. e. a combination of one element in each group of respectively three, ten, ten elements. Such example of code is chosen so as to use the simplicity of the decimal notation and because it has been assumed that there were only three hundred destination receptacles, this example is evidently not limitative and generally if N is the total number of destination receptacles a code $$C_a^1 \; C_b^1 \; C_c^1 \ldots C_k^1$$

can be used with $n$ groups respectively A, B, C, ... K of respectively $a, b, c, \ldots k$ elements, with $a \times b \times c \times \ldots x k = N$, one element only in each group characterizing the selection at the corresponding stage.

The minimum number of elements used, i. e. the minimum of $a+b+c+ \ldots +k$ is obtained for $$a=b=c= \ldots =k=\sqrt[n]{N}$$

Having thus described the principles of operation, a practical embodiment shown in Figs. 1 to 13 and to which we refer as combined code recorder and selector will now be described. This combined recorder and selector comprises mechanical elements for carrying out the functions herebefore explained. It is further assumed that such a combined recorder and selector is the image of a letter holder and is mounted on an image chain of the main conveyor chain carrying the letter holder. There are therefore as many combined recorder and selector units as there are letter holders on the main conveyor chain.

A preliminary description will first be given with the help of Figs. 1, 2, 3.

The combined recorder and selector unit shown comprises a frame 1 which has the shape of a flat parallelepiped slightly curved on its two vertical faces having the two main dimensions. This frame 1 is divided in compartments delineated by partitions such as: I, II, III, IV, V (Figs. 1 to 3). It is assumed that the letter sorting machine distributes to three hundred destination receptacles and four compartments are used, the first three for three groups of selecting elements and the fourth for an additional element to actuate the delivery means when the carried letter reaches its destination whatever the latter may be.

In the first compartment between partitions I and II (at the right of Figs. 1 and 2 and at the left of Fig. 3) are shown three flat selecting bars 5 constituting respectively the three elements corresponding to the hundreds digits 1, 2, 3, within circles (Fig. 1) in the first group of elements.

The selecting bars 5 are single bars having only two possible positions: the normal position as shown, for the normal condition and the selecting position for the selecting condition which is obtained by lifting the bars upwards. This is achieved by pushing upwards the bottom end of the cocking members 6 by means of an electromagnet or by any other suitable means controlled by the operator.

The manner in which the selecting bars are maintained in position within the frame 1 will be explained further on in the description.

The first compartment also comprises a release crank common for the three selecting bars 5. This crank is constituted by the two lateral webs 2, 2' and the crank pin 3 and can rotate outwardly around axis 4, 4' under action of any of the selecting bars 5 (Figs. 1 and 2).

The first compartment further comprises (Figs. 1 and 3) a catching pawl 15 with two lateral webs 12, 12'. This catching pawl is also common to all three selecting bars 5 and is provided to maintain any of these selecting bars in the selecting position after the corresponding cocking member 6 has been pushed upwards. It can rotate around the two axis 13, 13'.

Three kinds of restoring springs are further provided, the spring 9 for the common release crank 2, 2', the spring 16 for the common catching pawl 15 (Figs. 1 and 2), and the springs 19 for each of the selecting bars 5 (Fig. 3).

The sectional view shown in Fig. 4 is made along the plane A—A between the partition I and the webs 2 and 12 of the release crank and of the catching pawl respectively, whilst the sectional views shown in Figs. 5 to 7 are made along the plane B—B between the two selecting bars 5 corresponding to the hundreds digits 2 and 3.

In the second compartment between frame 1 and partitions II and III (Figs. 1, 2, 3) are shown ten pairs of flat, aligned bars, each pair constituting an element corresponding to a tens digit such as 0, 1, 2, . . . 9 within the circles above the bars.

Each pair of bars corresponding to a tens digit is constituted by a cocking bar 33d and by a selecting bar 33'd. The letter d used hereafter at the designation end of all components parts of the second compartment (tens digits) is intended for discrimination with the identical components of the third compartment (units digits) of which the designations will be ended by the letter u and of the fourth compartment (delivery) of which the designations will be ended with the letter r.

For the normal condition, the bar pairs are in the position shown. When a tens digit has to be recorded and selected, in the corresponding pair of bars, the cocking bar 33d is first lifted upwards by pushing upwards its cocking member 34d whilst the selecting bar 33'd remains as shown, thus giving the recording condition. For the selecting condition the selecting bar 33'd is in turn moved upwards by spring action as will be explained later.

The second compartment also comprises a release crank common for the ten selecting bars 33'd of the tens group. This crank is constituted by the two lateral webs: 30d, 30'd and the crank pin 31d and can rotate around the axis 4', 4" under action of any of the selecting bars 33'd (Figs. 1 and 2).

On the same side of the second compartment there is also a release pawl 41d with two lateral webs 29d, 29'd and an extension member 28d extending towards the first compartment. This release pawl is also common for the ten selecting bars 33'd of the tens group and is actuated via the extension member 28d by the release crank 2, 2', 3, of the first compartment. It can rotate around the axis 4', 4" (Figs. 1 and 2). This common release pawl has a longitudinal aperture 41da to allow ready access to and replacement of the springs behind it.

On the opposite side (Fig. 3) the second compartment also includes a catching pawl 44d with two lateral webs 40d, 40'd which can rotate around the two axis 42d, 42'd. This catching pawl is common for the ten cocking bars 33d of the tens group and is provided to maintain the cocking bars in the recording position after the corresponding cocking member 34d has been lifted upwards.

Four kinds of restoring springs are further provided in the second compartment: spring 37d (Figs. 1 and 3) between the common release crank 31d and the frame, spring 45d (Figs. 1 and 2) between the common catching pawl 44d and the common release pawl 41d, springs 48d (Fig. 3) between each cocking bar 33d and the frame, springs 48'd (Figs. 1 and 2) between each cocking bar 33d and the selecting bar 33'd of the same pair.

When recording and selecting according to the tens digit of the destination code, the cocking bar 33d of the corresponding pair of bars is first lifted upwards against the tension of spring 48d into the recording position, corresponding spring 48'd is also brought under tension, but, however, the corresponding selecting bar 33'd is prevented from being lifted upwards by spring action into the selecting position until the release pawl 41d is actuated by the motion of the release crank of the first compartment at the end of the selection of the hundreds digit. These sequential operations will be described in more detail further on.

The sectional view shown in Fig. 8 is made along the line C—C in Fig. 2 between the partition II and the webs 30d, 40d of the release crank and the catching pawl respectively, whilst the sectional view shown in Figs. 9 to 13 is made along the line D—D in Fig. 2 between the two pairs of selecting bars corresponding respectively to tens digits 0 and 1.

The third compartment between the frame 1 and the partitions III and IV is for the units digit part of the selection and is absolutely identical to the second compartment and therefore does not need to be further described.

The fourth compartment between the frame 1 and the partitions IV and V is also identical to the second and third compartments except that it only comprises one pair of selecting bars and that, since at that final stage no further stage need be controlled, no release crank is provided therein.

As already mentioned, the component parts of the third and fourth compartment which are identical to the component parts of the second compartment are characterized respectively by the end letters u and r of their designation.

A detailed description will now be given in conjunction with Figs. 4 to 13.

As shown in Figs. 4 to 7 which relate to the hundreds digit part of the combined recorder and selector, a selecting bar 5 is provided having a bottom cocking portion 6 (by which the bar is actuated into selecting condition when the operator forms the corresponding hundreds digit of the destination code) and an upper selection portion 7, which when the selection bar 5 is in the selecting position and in this position only, strikes the stop 27 corresponding to the required hundreds group of desination receptacles when the letter holder and its image combined recorder and selector have completed the travel up to the first destination receptacle of this required hundreds group.

In the normal position the selecting bar 5, which is engaged vertically through the corresponding bottom slot 1" of the frame 1 (Fig. 5) with a certain clearance to allow a certain amount of rotation of the bar in its plane, is held by its shoulder portion 25 against the rim of the slot. The bar is normally urged downwardly by the spring 19. This spring is engaged on the one hand in a hole 22 made in the frame 1, and on the other hand in the hole 21 made in the extension portion 20 at the median part of the selecting bar 5. Laterally the selecting bar 5 is held on the one side by the crank pin 3 of the common release crank and on the other side by the common catching pawl 15. The crank pin 3 and the common catching pawl 15 are respectively pressed against the selecting bar 5 by the restoring springs 9 (Fig. 4) and 16 (Figs. 4 and 5). The spring 9 is attached at one end to a stud 10 which stud is fixed to the frame 1 and is attached at its other end to another stud 8 fixed to the release crank, the stud 8 being mounted on the inner side of the web 2 (Figs. 1, 2, 3, 4). The spring 16 is attached at one end to a stud 17 which stud is fixed to the frame 1 and is attached at its other end to another stud 18 fixed to the catching pawl 15, the stud 18 being mounted on the inner side of the web 12' (Figs. 1, 2, 4, 5).

Slightly above the extension portion 20 (Figs. 4 and 5), the selecting bar 5 has a cam surfaced finger 23, a notch 24 being formed between the finger 23 and the portion 20.

When, upon the reception of the hundreds digit of the destination code, the corresponding selecting bar 5 is pushed upwards by the cocking portion 6, the common catching pawl 15 is forced to rotate in the direction of the arrow fo (Fig. 6) against the action of spring 16 by the slanted surface of the finger 23 moving upwards. As soon as the notch 24 arrives in register with the end of the catching pawl 15 the latter engages the notch since it is forced therein by the action of the spring 16 exerted in the direction of the arrow f'o. From that moment the lifted selecting bar 5 is prevented from being restored to the normal position, since the finger 23 is maintained by the common catching pawl. In this selecting position (Fig. 6), the selecting portion 7 protrudes upwardly with respect to the other selecting portions of the other selecting bars of the hundreds group and when the combined recorder and selector reaches the position corresponding to the first destination receptacle of the required hundreds group of receptacles it will thus be capable of striking the detecting stop 27 provided thereat, whilst the other selecting portions of the other selecting bars of the same hundreds group which are not in the selecting position, will pass beneath the corresponding detecting stops provided at the position corresponding to the first receptacle of their respective hundreds group without striking them.

When the selecting portion 7 of a selecting bar 5 in the selecting position strikes the detecting stop 27 of the corresponding hundreds group (Fig. 7), due to the clearance provided at the slot 1" and to the aperture 1' provided for each bar at the top left of the frame 1, the selecting bar 5 is caused to rotate in the direction of the arrow f1 and therefore it drives the crank pin 3 of the common release crank in the same direction; the common release crank therefore rotates in the direction of the arrow f2 around the axis 4, 4' and the member 26 of the web 2' drives by its rotation the extension member 28d of the common release pawl 41d in the compartment of bars of the tens digit group, the effect of which will be described later.

At the same moment, although by the action of spring 16 the common catching pawl 15 has a tendency to follow the selecting bar 5 when rotating, this is prevented by the extension portion 14 of the web 12 (Fig. 4) which acts as stop against the stop pin 11 coaxial to the fixed stud 10. By the rotation of bar 5, the common catching pawl 15 is thus disengaged from the notch 24 of the selecting bar 5, and the bar 5 by the action of its restoring spring 19 is retracted to its normal position whilst the common release crank is also restored to normal by action of its restoring spring 9.

Figs. 8 to 13 relate to the tens or to the units digit part of the combined recorder and selector, these parts being identical. In these figures, a designation number such as for example 41 is to be understood as 41d for the tens digits and as 41u for the units digits.

For each tens or units digit a pair of bars is provided, namely the cocking bar 33 and the selecting bar 33', shown in the normal position at Figs. 8 and 9. These bars can slide vertically one with respect to the other, this sliding is however limited by a suitable shape of the bars. For instance the selecting bar 33' may be provided with a lateral inner stop portion such as 56' sliding in a corresponding lateral inner groove 56 provided on the cocking bar 33 (Figs. 9 and 10).

On each cocking bar 33 is riveted a T-shaped member 49 for springs 48 and 48'; the left arm 50 of the T being bent diagonally to its plane (Figs. 1, 2 and 8 to 13), and the right arm, 51 being bent normal to its plane (Figs. 3 and 8 to 13). The arm 50 extends to the left of the selecting bar 33' and has a hole 53 (Figs. 1 and 10) therein for the attachment thereto of an end of restoring spring 48' which extends between the cocking bar 33' and the aperture 51' in portion 52' of the selecting bar (Figs. 1, 3 and 9).

As for the selecting bar in the hundreds group, the cocking bar 33 has a cam tooth 55 forming a notch 61 with the bent portion of arm 51 (Figs. 1, 8 to 13).

The selecting bar 33' has also a cam tooth 55', (Fig. 9) but inclined in a direction opposite to the direction of cam tooth 55. The common release pawl 41 normally engages tooth 55' to prevent the selecting bar 33' from being lifted upwards by the action of spring 48' as a result of the cocking bar 33 being lifted upwards into the recording position.

In the normal position, as shown in Figs. 8 and 9, the bars 33, 33' are held by the combined actions of spring 48 and 45, the said springs pressing the tooth 55 of the cocking bar 33 against the common catching pawl 44 and against the rim of slot 1' and spring 45 urges the common release pawl 41 against the selecting bar 33'. The spring 37 forces the common release crank pin 31 against the selecting bar 33'.

When the operator has formed the code number of the required destination, at the same moment that a selecting bar 5 has been brought to the selecting condition in the hundreds digit group, one cocking bar 33 (33d) in the tens digit group and one cocking bar 33 (33u) in the units digit group are pushed upwards into the recording position (Fig. 11). Before reaching this position, the cam teeth 55d, 55u of the cocking bars mentioned push the common catching pawls 44d, 44u of the respective groups in the direction of the arrow f'o (Fig. 10) until these common catching pawls are forced back by action of springs 45d, 45u into the notches 61d, 61u in the direction of arrow fo.

At the same moment the T-shaped members 49d, 49u riveted to the cocking bars 33d, 33u respectively (Fig. 9) are also driven upwards and bring the springs 48'd, 48'u respectively under tension. However, the cam teeth 55'd, 55'u of the respective selecting bars 33'd, 33'u are caught underneath the common release pawls 41d, 41u respectively and the selecting bars are prevented from following the upward movements of the corresponding cocking bars. In the recording position: a cocking bar is lifted; a selecting bar is not lifted; and the selecting portion 35 of a selecting bar cannot strike the detecting stop such as 59 of the corresponding tens or units group of destination receptacles.

We have seen that, when the combined recorder and selector corresponding to a particular letter to be sorted reaches the detecting stop 27 of the required hundreds group, the common release crank of that group (Fig. 7) is caused to rotate so as to drive by its member 26 the extension member 28d of the common release pawl 41d of the tens group i. e. of the compartment immediately adjacent. In that group only the common release pawl 41d rotates around its axis 4', 4" in the direction of the arrow Fo (Fig. 11), thus disengaging the cam teeth 55'd of all ten selecting bars 33'd of that tens digit group. However, since only one of these selecting bars, i. e. of the pair of cocking and selecting bars which has been previously set in the recording position, was held against the tension of spring 48'd, only that selecting bar springs to the lifted selecting position (Fig. 12) in which the selecting member 35d will now be in the path of the detecting stop 59d of the corresponding tens group of receptacles when later the combined recorder and selector reaches that corresponding position. By action of spring 45d, the common release pawl 41d is driven back in the direction of the arrow F'o below the finger 55'd of that selecting bar in the selecting position and above all the other selecting bars in normal position.

In the units group no selecting bar is yet brought into selecting condition since the common release pawl 41u of that group has not been actuated.

When the selecting portion 35d of the selecting bar 33'd in the selecting condition in the tens group strikes the corresponding detecting stop 59d, both the selecting bar 33'd and the cocking bar 33d are caused to rotate in the direction of the arrow f1 (Fig. 13), due to the clearance provided for at the slot 1" and to the aperture 1' at the top part of frame 1. In the same manner as for the hundreds group, this drives the common release crank pin 31d and the common release crank rotates around axis 4', 4". The extension member 60d (Figs. 1, 9, 12 and 13) of the crank web 30'd drives the common release pawl 41u of the units group, by the intermediary of the extension member 28u. This results in the transfer of the selecting bar, in the pair of bars previously set into recording position, to the selecting position in the same manner as for the tens group.

At the same moment the extension 43d of the web 40d of the common catching pawl is stopped against the stop pin 39d (Figs. 1 and 8), this common catching pawl 44d is prevented from following the rotative motion of the two bars 33'd, 33d and is therefore disengaged from the notch 61d. By the combined action of all restoring springs the two bars of the operated pair are restored to normal.

When in turn the selection member 35u of the selecting bar 33'u in the selecting position in the units group strikes the corresponding detecting stop 59u, the selection is completed, i. e. that the letter holder of which the combined recorder and selector is the image has reached the required destination, and therefore the device which has to open the letter holder for delivery of the letter can be actuated.

Since the selection ends on the units digit i. e. on ten possible selecting bars of the units group, it is found convenient to have on the combined recorder a further pair of cocking and selecting bars for the actuating control of the delivery device, so that whatever may be the unit digit ending the selection code, this pair of bars will always control the opening of the letter holder on reaching its destination.

This single pair of bars is similar to any pair of bars of the tens and units groups as shown in Figs. 8 to 13. It is, as stated, contained in the fourth compartment, and no release crank is required with this single pair since it is not necessary to control further selection stages.

The operation of the delivery bar pair can also be explained in conjunction with Figs. 8 to 13, assuming that the common release crank pin 31 and the common release crank webs 30, 30' have been withdrawn as well as restoring spring 37 and that all the designation numbers are ended by the letter "r."

When the operator forms the destination code, this has also the effect of bringing the delivery cocking bar 33r into the recording position, whatever the code is.

The delivery pair of bars 33r, 33'r remains in that position, as explained for the pairs of the tens and units selection groups until the last selection (units) is successful when the release pawl 41r is actuated via its extension member 28r by the common release crank of the units group. This effects the release of the delivery selecting bar 33'r which springs into selecting position, as already described for the tens and units selection groups, thus directly actuating the delivery device.

Although the example chosen for explanation involves some 300 destination cases characterized by means of a code $$C_3^1 \ C_{10}^1 \ C_{10}^1$$

N destination receptacles could be characterized by any code $$C_a^1 \ C_b^1 \ C_c^1 \ldots C_k^1$$

with $a \times b \times c \times \ldots \times k = N$. In this case there would be $n$ selection compartments with $a$ single selecting bars in the first, $b$ pairs of cocking and selecting bars in the second, ... $k$ pairs of cocking and selecting bars in the $n^{\text{th}}$ compartment. A $n+1^{\text{th}}$ compartment with a single pair of cocking and selecting bars would be provided for the delivery control of the letter at the end of the selection.

We have assumed that the destination receptacles were met successively in increasing code number order, it being evident that it must be so if it is desired to keep to a minimum the number of detecting stops met by the selecting bars (this minimum number being one stop-per-selecting bar.

If for practical reasons the receptacles are not to be encountered in an increasing number order, translating means could always be used between the key sender of the sorting operator and the operating devices actuating the selecting bars of the first selection group, and the cocking bars of the other selection groups. These translating means may, however, be found expensive and on some occasions the combined recorder and selector can be so arranged so as to reduce the translating means to their minimum.

The described embodiments of combined recorder and selector may be mounted either on the letter holder to which they correspond or mounted on an image conveying chain at a reduced scale of the main conveying chain carrying the letter holders. In the latter case, the combined recorder and selectors are only images of the letter holders whilst the image detecting stops are images of the destination receptacles.

This latter case may be found interesting for various reasons. Amongst others, since the image chain at reduced scale is synchronized with the main chain, it takes the same time to compete a cycle as the main chain, its linear speed is therefore smaller than the one of the main chain which further reduces the wear caused by the strikings between selecting members and detecting stops. Then the main chain and the letter holders may be kept as simple as in the machine disclosed in my prior U. S. Patents Nos. 2,689,657, 2,761,680 and 2,764,275. Further, the image chain with combined recorder and selectors as image of the letter holders enables an easy checking at any time of the progression of any letter holder in its travel towards its destination and an easy detection of any disturbance or defect in the course of said progression. Also, it may be located at any convenient place distant from the sorting machine.

The method for cocking of the element bars when the operator depresses the keys of his keysender will now be described. There must be provided an indexing mechanism for each element bar. The main problem is: since the operator depresses the code key at a random moment within the period allotted to him for indexing in the interval between the passages of two successive letters, how to make certain that the corresponding element bar on the combined recorder and selector associated with the letter holder containing the letter for which the operator is indexing and that element bar only is securely cocked.

Fig. 14 shows as example a possible embodiment for solving this difficulty. We assume that the contact 68 controlled by the cam 67 is closed for the time interval available for indexing. This interval may, for instance, be ⅔ of the time period between the passages of two successive letters in front of the operator's indexing position. The cam 67 is synchronized with the main conveyor chain and opens contact 68, for instance during ⅓ of the above mentioned time period. Assuming now that the contact 68 is closed (available interval for indexing), when the operator depresses the indexing key K for the corresponding digit, a circuit is closed for the operation of electromagnet 65 via: earth, closed contact K, left winding of electromagnet 65, closed contact 68, negative battery. Electromagnet 65 is locked up by its right-hand winding and its own contact 66. The operation of the electromagnet draws the armature 61 forming part of a bellcrank lever capable of pivoting around pivot 64. The arm 62 of this lever carries a roller 63 which is normally outside the path of the element cocking members 6. Upon attraction of armature 61 to the electromagnet 65, the arm 62 is lifted as at 62' so that the roller assumes the position 63' shown in dashed line and into the path of the element cocking bar in the required combined recorder and selector. The driving motion of the combined recorder and selector forces the cocking member 6 against the roller in position 63'. Since the travel of the mentioned roller in the direction of arrow I (of the conveying motion) is limited and since the member 6 is prevented from rotating in the direction opposite to arrow I within the combined recorder and selector, the stress exerted by the conveying image chain has for results in a vertical movement in the direction of arrow III of the bar carrying the member 6 and a rotation of the roller 63 around its axis in the direction of arrow II. The vertical upward movement of the member 6 brings the corresponding bar into recording (or selecting condition if it is a bar of group 1). At the end of the available indexing interval the cam 67 opens at contact 68 the operating and blocking circuits of the electromagnet 65 which releases and is therefore unable to index the element bar in the following combined recorder and selector units. It is therefore seen that provided the operator depresses his code keys within the available interval for indexing, which generally is of a sufficient duration, only the combined recorder and selector associated with the letter holder carrying the letter corresponding to the destination code keyed will be indexed in a secure manner. It is obvious that other suitable indexing mechanisms could be used.

Fig. 15 discloses a main belt MB which rotates about a plurality of spaced pulleys P in a manner similar to that disclosed in applicant's said U. S. Patent No. 2,689,657. Attached to the belt MB there is an article holder AH containing an article A which is destined for one of the receptacles R. Attached to the article holder AH is the combined recorder and selector unit 1 whose structure has been already described hereinabove. The selecting elements 7 cooperate with the stops 27 as previously explained. The proper combination of stops will cause the holder AH to deliver the article which it carries to the receptacle whose position corresponds to the proper code combination of stops.

Figure 16:
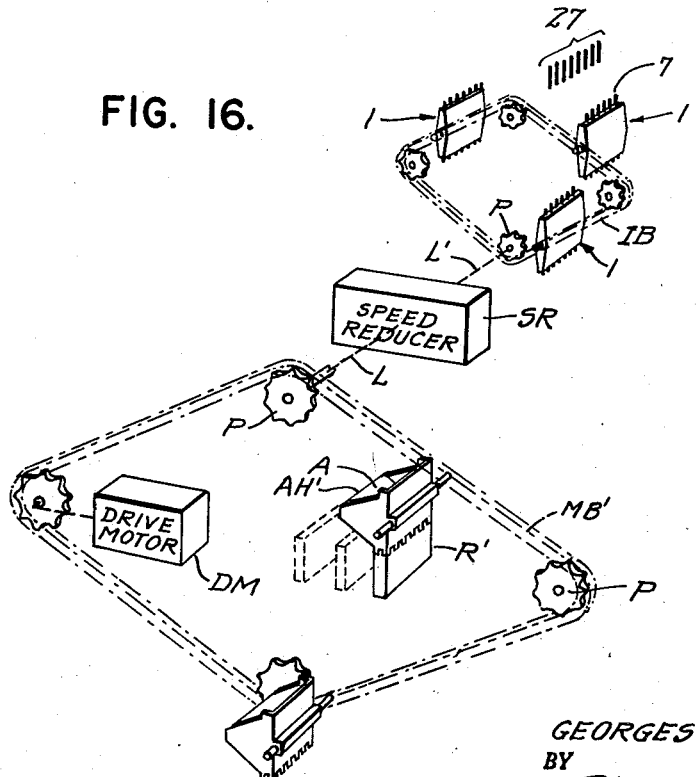

In Fig. 16 there is schematically shown an alternative arrangement. The Fig. 16 showing includes a main belt MB' which carries an article holder AH' and which holder is adapted to deliver the article A to a predetermined one of the receptacles R'. The belt MB' is driven by a motor DM. The image belt IB is coupled to a pulley of the main belt MB' by means of a speed reducer SR and shafts L, L'. The recorder and selector 1 is carried by the image belt IB. The elements 7 cooperate with the stops 27 as explained previously. In either of the arrangements in Figs. 15 or 16 the recorder and selector units control the operation of the article holders by any suitable means available to those skilled in the art.

While the principles of the invention have been described above in connection with specific apparatus, it is to be clearly understood that this description is made only by way of example and not as a limitation on the scope of the invention.

What is claimed is:

1. In a sorting machine comprising a conveyor moving along a plurality of destinations, a plurality of code recorders each comprising a plurality of groups of recording elements for recording any code combination corresponding to any of said destinations to which an object to be sorted may have to be directed, each of said recording elements having a first stable normal condition and a second stable recording condition, said any code combination consisting of one corresponding element being in said second recording condition in each of said groups of said plurality of groups and comprising further fixed means for detecting a recorded combination of elements in said second condition at the time that the corresponding object has reached its destination and thereupon to deliver said object to said destination, a combination characterised in this, that the elements in all groups of said plurality of groups starting with the second group have also a third stable recording condition not detectable by said detecting means, means in each recorder responsive to signals characterizing a particular destination for transfering one corresponding element of said first group of said plurality of groups from the first to the second condition, whilst transferring one corresponding element in each other group of said plurality of groups from the first to the third condition, transfer means provided between successive groups of said plurality of groups for transferring the element of the immediately following group from the third condition in which it had been previously set, to the second condition in which it can now be detected in turn, in response to detection and subsequent return to the first condition of an element in said second condition, whereby during the conveying travel of the object the detection of its destination is carried out in stages, only one element at a time being in the second condition and therefore being able to be detected at a corresponding part of said travel depending on the destination code.

2. In a sorting machine as claimed in claim 1, the combination further characterized in this, that in each recorder each of said groups of elements comprises a first memory holding means provided in common for all elements of said group for preventing, upon any element being transferred from the first stable normal condition to said second stable condition or upon any element being transferred from said first stable normal condition to said third stable condition, said element from being transferred back to said first stable normal condition before being detected in said second condition by said fixed detecting means, and that each of said other groups of elements further comprises a second memory holding means provided in common for all elements of said group for preventing any element therein from being transferred from said third stable condition to said second stable recording condition before an element of the preceding group has been detected by said fixed detecting means as being in said second stable condition.

3. In a sorting machine as claimed in claim 1, the combination characterized in this, that an element in a recorder consists of a pair of flat bars displaceable in a plane parallel to the direction of the carrying conveyor, said pair comprising a cocking bar for setting the element in said third stable condition and a selecting bar for setting said element in said second stable condition, one pair of ends of said bars is inserted with a certain clearance within a slot at the bottom of the frame holding said recorder and the other pair of ends in an aperture at the top of said frame, in such a way that both bars can rotate in their plane within said slot and aperture and can be moved longitudinally through said slot and aperture, that said cocking and selecting bars are interconnected by means of a first spring so that the longitudinal motion of said cocking bar stores energy in said spring, the selecting bar being at that moment held by said second memory holding means, that said cocking and selecting bars comprise stopping means to limit their relative travel, that a shoulder part of said cocking bar is normally forced by means of a second spring against the rim of said slot, no longitudinal stress being then exerted on said selecting bar, that both cocking and selecting bars are held laterally by said transfer means and by said first and second memory holding means and are thus prevented from rotating in their plane when they are in said first normal condition.

4. In a sorting machine as claimed in claim 3, the combination characterized in this, that each element of said first group of elements in a recorder consists of a pair of said cocking and selecting bars rigidly connected to each other so as to form a single selecting and cocking bar, whose actuated position defines said second condition of the element without an intermediate third stable condition.

5. In a sorting machine as claimed in claim 1, the combination characterised in this, that said transfer means each common to all elements of a same group consist of a common release crank comprising a transversal crank pin and two lateral webs, that said webs are able to rotate around a suitable transversal axis, that a spring fixed to said crank is provided to apply said crank pin against the lateral side of said selecting bars, so that said crank is caused to rotate against the action of said spring when a selecting bar of the group is tripped by a detecting means, that said crank further carries an extension member for temporarily driving, upon being rotated, the adjacent second memory holding means controlling the selecting bars in the following group so as to permit the element in that group which is in said third condition to be placed into said second condition.

6. In a sorting machine as claimed in claim 3, the combination, characterized in this, that said first memory holding means consist, in each element group of a recorder, of a common catching pawl able to rotate around a suitable transversal axis by the intermediary of its two lateral webs, said catching pawl being normally forced by spring action against the lateral side of all of the selecting bars of the group or against the lateral side of all the cocking bars of the group and being provided to hold any of these bars by means of a protruding part provided thereon, when said bar has been moved longitudinally into said second or third stable condition.

7. In a sorting machine as claimed in claim 2, the combination characterized in this, that said second memory holding means consist, in each other element group of a recorder, of a common release pawl able to rotate around a suitable transversal axis by the intermediary of its two lateral webs, said release pawl being normally forced by spring action against the lateral side of all the selecting bars of the group and holding normally any of these selecting bars by means of a protruding part provided thereon, thus preventing said selecting bar from being moved longitudinally into the second stable condition, that said release pawl carries an extension on which said extension member of said common release crank of the preceding group normally rests, whereby upon said crank rotating as a result of the preceding selection stage being completed, said common release pawl is driven by said extension member and rotates so as to be disengaged from the protruding parts of the selecting bars thereby permitting that bar in the third stable condition to be longitudinally moved into said second stable condition.

8. In a sorting machine as claimed in claim 1, the combination, characterised in this, that each of said code recorders comprises a supplementary recording element having also a first stable normal condition, a second stable recording condition and a third stable recording condition, means for transferring said supplementary element from the first to the third stable recording condition when the destination code is impressed on the recorder by the operator, transfer means provided between the elements of the last group of said plurality of groups and said supplementary element, means operative in response to any element of said last group being detected thus completing the detection indicating that the corresponding letter has reached its required destination, for transferring said supplementary element from its third to its second stable recording condition, to actuate the delivery means corresponding to said required destination, and means responsive to actuation of said delivering means by said supplementary element to cause the restoration of said supplementary element to its first stable normal condition.

References Cited in the file of this patent

UNITED STATES PATENTS

| 1,816,887 | Adams | Aug. 4, 1931 |
| 2,386,520 | Watson et al. | Oct. 9, 1945 |